United States Patent
Hughes

(10) Patent No.: US 8,845,299 B1
(45) Date of Patent: Sep. 30, 2014

(54) ANTI-VIBRATION FAN CONTROL SYSTEM AND METHOD FOR MODULAR POWER SUPPLIES

(75) Inventor: Robert William Hughes, Uster (CH)

(73) Assignee: PAI Capital LLC, San Jose, CA (US)

(*) Notice: Subject to any disclaimer, the term of this patent is extended or adjusted under 35 U.S.C. 154(b) by 245 days.

(21) Appl. No.: 13/237,459

(22) Filed: Sep. 20, 2011

Related U.S. Application Data

(60) Provisional application No. 61/421,402, filed on Dec. 9, 2010.

(51) Int. Cl.
*F04D 13/12* (2006.01)
*F04D 15/02* (2006.01)

(52) U.S. Cl.
USPC .................................... 417/2; 417/42

(58) Field of Classification Search
USPC ........................... 417/42, 423.5, 2
See application file for complete search history.

(56) References Cited

U.S. PATENT DOCUMENTS

| | | | |
|---|---|---|---|
| 6,257,832 B1* | 7/2001 | Lyszkowski et al. | 417/2 |
| 6,549,349 B2 | 4/2003 | Sri-Jayantha et al. | |
| 7,190,142 B2 | 3/2007 | Ha | |
| 7,282,873 B2 | 10/2007 | Abali et al. | |
| 7,661,316 B2 | 2/2010 | Gross | |
| 2009/0015241 A1* | 1/2009 | Gross et al. | 324/166 |
| 2009/0134827 A1* | 5/2009 | Jeung | 318/432 |

FOREIGN PATENT DOCUMENTS

JP 2005050448 2/2005

* cited by examiner

*Primary Examiner* — Bryan Lettman
(74) *Attorney, Agent, or Firm* — Waddey Patterson; Mark J. Patterson; Gary L. Montle

(57) ABSTRACT

System and methods are provided for reducing vibration in server or data storage units. An anti-vibration system according to the present invention includes one or more disk drives and one or more fans in a defined area, and a controller which is configured to control operation of each of the one or more fans. A nominal speed setting and a speed range are determined for the one or more fans, either commonly or independently with respect to each, and the fans are caused to be driven in accordance with the determined speed setting and speed range. As a result the occasions in which individual fan speeds are coincident with fixed frequency sensitivities for each disk drive are substantially minimized.

20 Claims, 2 Drawing Sheets

ANTI-VIBRATION FAN CONTROL SYSTEM AND METHOD FOR MODULAR POWER SUPPLIES

CROSS-REFERENCES TO RELATED APPLICATIONS

This application claims benefit of the following patent application which is hereby incorporated by reference: U.S. Provisional Patent Application No. 61/421,402, filed Dec. 9, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to systems and methods for controlling fan speeds in a defined area. More particularly, the present invention relates to an anti-vibration system and associated methods for controlling fan speeds to reduce the impact of fan-induced vibrations in a server, a storage system, or in any other product containing vibration sensitive devices.

The storage systems industry has been plagued for years with issues of system performance being degraded by vibration sources external to the disk drives used in these sensitive systems. The ever-increasing data density of these disk drives means that they become even more sensitive to external vibration, especially on such systems as using for example the less-costly desktop disk drives in enterprise-level storage applications. The increased need for system cooling means that the system fan speeds increase annually, pushing the frequencies at which they emit vibrations into the range of sensitivity of the disk drives where the drive servo runs out of bandwidth. Consequently, server and storage applications have several sources of vibration that can potentially disturb the disk drives, a major source being the system cooling fans containing several different frequencies of vibration.

It is therefore desirable to mitigate the vibration effects on disk drives from power supply unit (PSU) fans or other system fans. Numerous methods have been introduced in the past to deal with this issue. One method is to isolate the fans entirely, but this method is not optimal in requiring sway space and additional components. Further, shock snubbing is also required. Another method involves providing improved one- or two-dimensional fan balancing to tighter limits, but this imposes substantial additional costs.

Yet another method which is particularly effective involves using three-phase fan motors, but again at a substantially higher cost. The structural stiffness or rigidity of the fans may be adjusted, but this requires additional design changes, development and accordingly time.

Damping methods may be incorporated to reduce resonant peaks in the fan frequencies, but the reduction in peaks is often insufficient to justify the additional costs involved.

It would therefore be desirable to introduce a system and method for reducing fan vibrations and the resultant effects or disturbances to disk drives, with a relatively minimal cost outlay.

BRIEF SUMMARY OF THE INVENTION

Systems and methods are provided herein to introduce fan speed cycling in a server or equivalent storage system without substantial costs and which may in various embodiments be implemented by software enhancement within the external fan speed control software or contained within the firmware of the fan.

In an aspect of the present invention, PSU or system fans are operated with respect to a nominal speed setting as determined by the system, but the instantaneous speed of each fan is further varied about the setting (e.g., +/−5%) so that the signature of the vibrations is constantly moving. In this way the fan vibration peaks that are affecting the disk drives may only be present for a short time while they move through the disk drive's zones of sensitivity. Instead of the disk drives always being unacceptably disturbed at some critical fan speeds, they may be only marginally disturbed across a range of fan speeds above a certain threshold speed below which the fan speeds may generally not affect the disk drives at all anyway. The airflow within the defined area including the disk drives may be unaffected, as the nominal speed remains the same regardless of the cycling speed about the nominal operating point.

In an embodiment, an anti-vibration system in accordance with the present invention includes one or more disk drives in a defined area and one or more fans positioned to direct airflow in the defined area. A fan speed controller is provided which determines a nominal speed setting for the one or more fans, further determine a speed range about the nominal speed setting for the one or more fans, and causes the one or more fans to be driven in accordance with the associated speed setting and range.

In another embodiment of an anti-vibration system according to the present invention, a controller maps a vibration sensitivity profile for one or more disk drives located in a defined area, determines a nominal speed setting for each of one or more fans, compares the determined speed setting to a predetermined threshold speed, determines a speed range for each of the one or more fans for which the determined speed setting is above the predetermined threshold speed, and causes the one or more fans to be driven in accordance with the determined speed settings and speed ranges.

In another aspect of an anti-vibration system within the scope of the present invention, the fan speed response at particular fan speeds can also be controlled within the fans themselves.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct connection between recited items or an indirect connection through one or more passive or active intermediary devices. The term "signal" as used herein may include any meanings as may be understood by those of ordinary skill in the art, including at least one current, voltage, charge, temperature, data or a state of one or more memory locations as expressed on one or more transmission mediums. Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Figure 1:
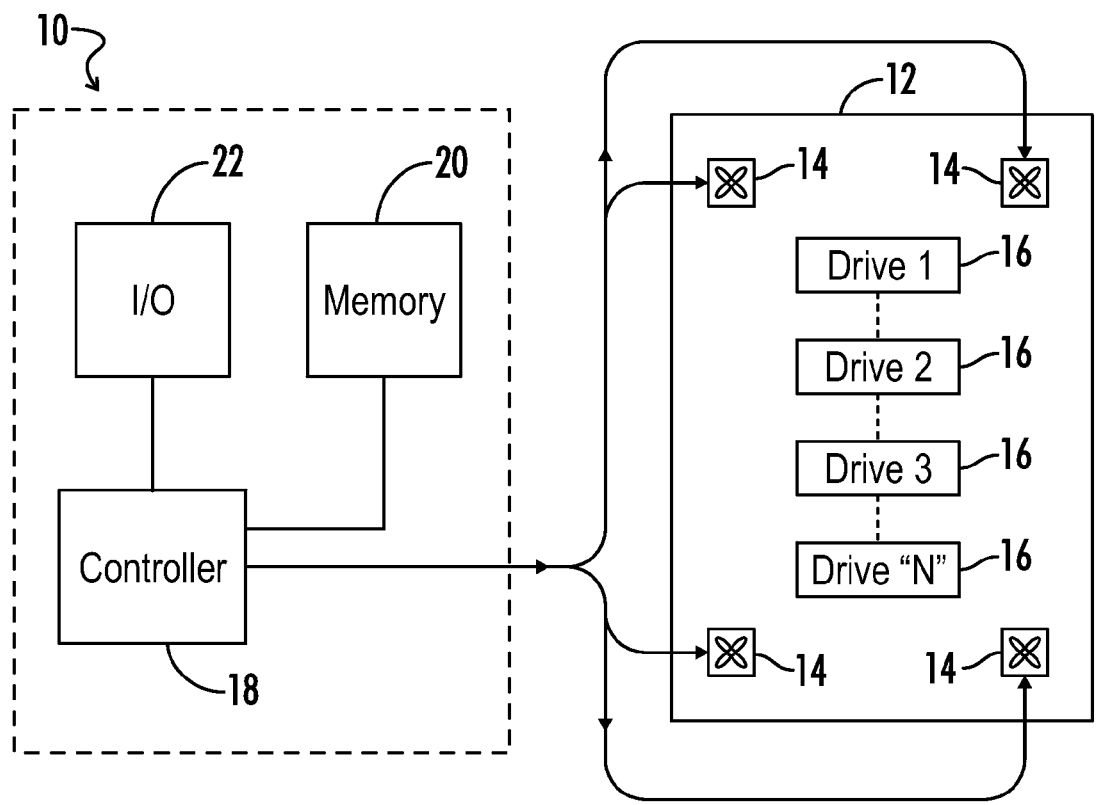
FIG. 1 is a block diagram representing an embodiment of an anti-vibration system in accordance with the present invention.
Figure 2:
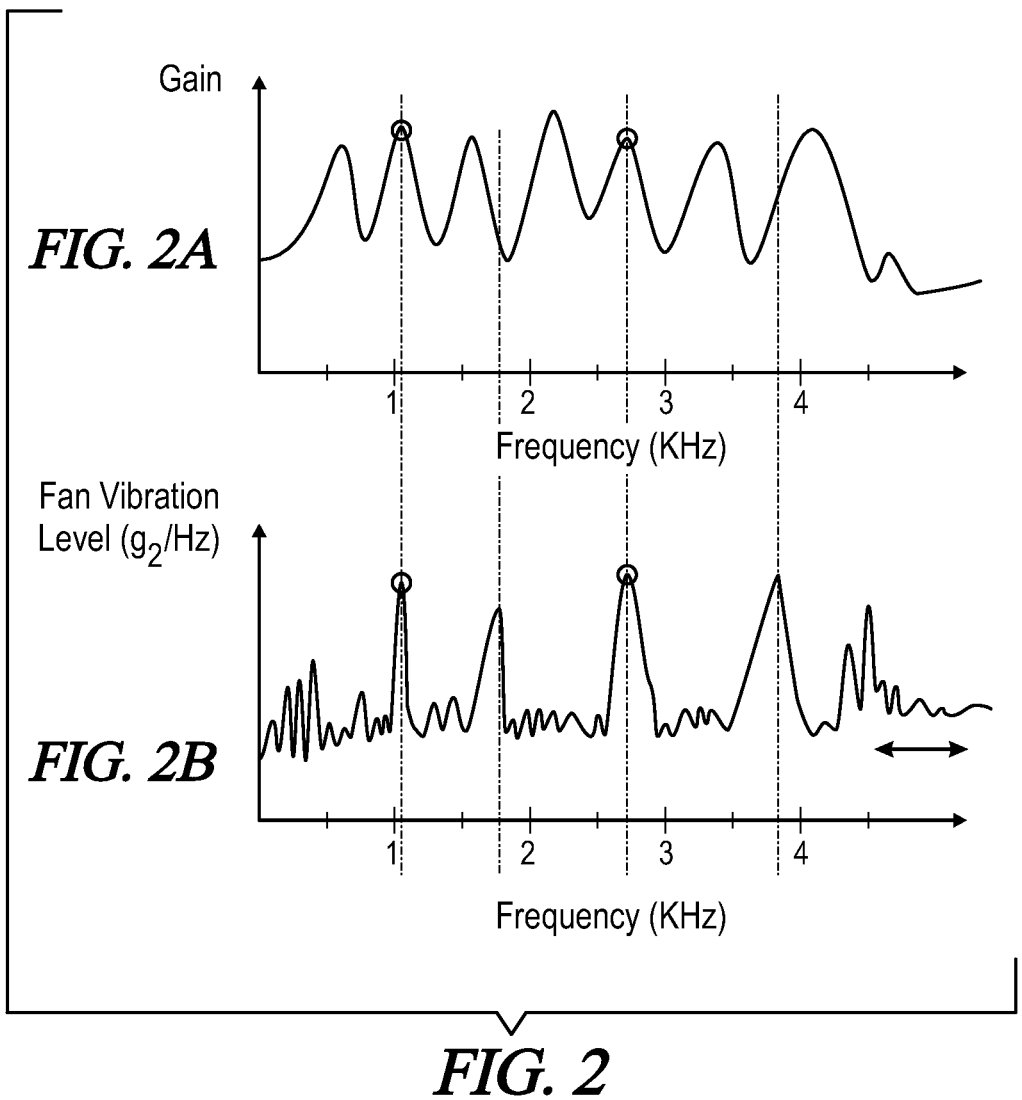
FIG. 2A is a graphical diagram representing an exemplary disk drive vibration sensitivity profile as mapped or otherwise determined in accordance with an embodiment of the present invention.
FIG. 2B is a graphical diagram representing an exemplary fan vibration level chart as mapped or otherwise determined in accordance with an embodiment of the present invention.

Referring generally to FIGS. 1, 2A and 2B, various embodiments of an anti-vibration system and associated methods are described herein for substantially reducing the detrimental effects of fan vibration in a defined area. Where the various figures may describe embodiments sharing various common elements and features with other embodiments, similar elements and features are given the same reference numerals and redundant description thereof may be omitted below.

Referring first to FIG. 1, an anti-vibration system 10 is provided for controlling fan speeds of one or more fans 14 in a defined area 12 which as shown is a server or data storage system having one or more disk drives 16. The system 10 as represented may include a controller 18 effective to drive the fans 14. The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein. In an exemplary configuration (not shown), the controller 18 may be formed by a microprocessor and a PWM generator. The fans 14 may further in certain embodiments be fan modules 14 which include (in addition to the fans themselves) a fan motor and motor drive effective to receive PWM signals from the controller 18 and to drive the fans based on the received PWM signals.

In an embodiment as represented in FIG. 1, the system 10 may include a controller housing within which various system components such as the controller are located outside of the defined area. Alternatively, the controller itself may reside in the defined area but be functionally linked or otherwise coupled to other components in a remote housing. One example of such a component may include a memory medium 20 effective to store firmware, program instructions or other data as needed to perform the various functions of the present invention when executed or requested by the controller 18. It may further be understood that more than one type of memory media may be used in combination to conduct processor-executable software, instructions or program modules from a first memory medium upon which the software, instructions or program modules initially reside to a processor for execution.

Another example of such a component to which the controller may be functionally linked may include an input/output terminal 22 or equivalent user interface 22 via which the controller 18 may receive nominal fan speeds or other predetermined settings in accordance with the present invention.

Referring now to FIG. 2A, an exemplary disk drive sensitivity profile is represented as gain versus input along a selected or potential frequency range associated with fan operation. At each frequency the measured response level may be divided by the (for example) 0.3 g to arrive at the gain as plotted along the y-axis. It may be understood that it is desirable to effectively minimize the amount of time in which a disk drive having the represented sensitivity function is exposed to the associated curve peaks.

Referring to FIG. 2B, a graph represents exemplary fan vibration levels along the same frequency range. If the input (fan vibration) is overlaid with respect to the graph shown in FIG. 2A (i.e., the system sensitivity transfer function) and multiplied together, the result is the output response of the system. Resonance issues may be precipitated if the overall output response is too high, or at certain frequencies that are amplified when the input peaks align with the behavioral peaks of the system. The vibration (input) signature for one or more fans is modulated so that fan vibration frequencies are kept constantly oscillating and the associated peaks do not align for an extended time, thereby reducing disturbances or other effects on the associated disk drives.

In various embodiments, a nominal fan speed and a speed range may be determined by the system controller in accordance with the present invention, and the one or more fans driven by control signals supplied by the controller in accordance with the determined fan speed and speed range.

One or more of the nominal fan speed and speed range may be predetermined in accordance with a known (or initially or preliminarily determined) disk drive sensitivity profile for disk drives which reside in the defined area, and a known (or initially or preliminarily determined) fan vibration signature. The nominal speed and speed range may be stored in a memory medium and read or otherwise obtained from the memory by the controller. In certain embodiments, the nominal speed and speed range may be pre-programmed in firmware and maintained until subsequent firmware revisions are required. In other embodiments, the nominal speed and speed range may be received from an external source via an I/O terminal or equivalent user interface and stored in the memory by the system controller.

Where for example an anti-vibration system of the present invention includes a plurality of fans, more than one nominal speed setting and/or speed range may be provided or otherwise determined by the system controller and associated with the various fans. This may be desirable where for example the vibration signatures of one or more fans vary with respect to other of the fans. If more than one nominal speed setting are provided, the system may in various embodiments maintain a constant percentage speed range with respect to the various nominal speed settings for each of the fans or alternatively may provide a common absolute speed range which encompasses the various nominal speed settings or a plurality of absolute speed ranges. The controller may in another embodiment be configured to determine a plurality of absolute speed ranges which are non-overlapping and further determine speed settings within the various speed ranges to be assigned to the plurality of fans.

In certain embodiments the nominal speed setting and an absolute speed range for each of the fans may in fact be the same (e.g., 300 Hz nominal setting and a range of 285 to 315 Hz), such that the airflow throughout the defined area remains consistent generally, but an independent starting speed setting may be provided for each fan. In this manner the fans independently operate throughout the speed range such that none of the fans operate at the same speed for an extended period of time.

Where one or more of the nominal fan speed and speed range are not predetermined such that the controller is configured to merely read the predetermined values and regulate the fan speeds accordingly, the controller may in certain embodiments within the scope of the present invention determine the nominal speed and/or speed range by mapping the disk drive sensitivity profile and/or the fan vibration signature using techniques as are known in the art, and selecting speed values to minimize the disturbances accordingly. The controller may for example be configured to determine the values so as to substantially avoid relative peaks in the output response, or may randomly determine values and confirm the values by comparing the result to the associated output function and rejecting the values only where a relative peak is observed.

In various embodiments the controller may be configured to determine only a nominal speed setting but to otherwise read or obtain a predetermined speed range value, as it may be desirable to restrict fan operation and associated vibration peaks within a narrow frequency band so as to reduce the sweep rate cycle time and still ensure that a substantial portion of the time they may not be coincident with disk drive structural resonances.

In certain embodiments within the scope of the present invention the controller may further determine or otherwise obtain a sweep cycle time duration (e.g., two seconds) in which the controller is configured to sweep the fan speed during each associated cycle.

In various embodiments of the present invention the controller may, upon determining a nominal speed setting for the one or more fans, compare the nominal speed setting to a predetermined threshold speed (e.g., 200 Hz) and only further determine a speed range for fan speed modulation when the nominal speed is greater than the predetermined threshold speed. This may be desirable where low fan speeds (i.e., speeds lower than the threshold value) are determined to result in inconsequential or at least relatively small fan vibrations and thereby relatively small disturbances on the associated disk drives, such that the additional steps for modulating the fan speeds are not necessary.

The previous detailed description has been provided for the purposes of illustration and description. Thus, although there have been described particular embodiments of the present invention of a new and useful "Anti-vibration Fan Control System and Method for Modular Power Supplies," it is not intended that such references be construed as limitations upon the scope of this invention except as set forth in the following claims.

What is claimed is:

1. An anti-vibration system comprising:
a plurality of fans positioned to direct an airflow in a defined area; and
a controller effective to
determine a nominal speed setting for an operating speed for each of the plurality of fans,
determine a speed range about the nominal speed setting for each of the plurality of fans, and
cause each of the plurality of fans to be driven in accordance with the associated nominal speed setting and speed range such that each of the operating speeds for each of the plurality of fans is caused to oscillate from the respective nominal speed settings throughout the respective speed ranges.

2. The system of claim 1, further comprising:
a memory medium effective to store a predetermined nominal speed setting for each of the plurality of fans and a predetermined speed range about the nominal speed setting for each of the plurality of fans; and
the controller is effective to determine the nominal speed setting and the speed range by obtaining the predetermined nominal speed setting and the speed range from the memory medium.

3. The system of claim 2, further comprising:
a user interface effective to receive one or more of the nominal speed settings for the plurality of fans and the speed ranges from an external source; and
the controller is effective to store the received nominal speed settings and speed ranges in the memory medium.

4. The system of claim 3, the nominal speed settings for the plurality of fans further comprising an independent speed setting for each of the plurality of fans.

5. The system of claim 4, the controller further effective to determine the independent speed setting for each of the plurality of fans.

6. The system of claim 5, wherein the operating speed for each of the plurality of fans is caused to be driven at a same percentage range about a respective independent speed setting.

7. The system of claim 6, wherein the controller is effective to determine the speed settings and percentage ranges about the respective speed settings for each of the plurality of fans wherein absolute speed ranges for each of the plurality of fans are non-overlapping.

8. The system of claim 1, wherein the controller is effective to determine one nominal speed setting and speed range for each of the plurality of fans.

9. The system of claim 8, wherein the controller is further effective to determine a different starting speed for each of the plurality of fans and cause the operating speed for each of the plurality of fans to be driven from their determined starting speed through a common speed range.

10. The system of claim 1, wherein the controller is further effective to compare the determined nominal speed setting to a predetermined threshold speed, and to cause the operating speed for each of the plurality of fans to be driven throughout the speed range when the nominal speed setting is greater than the threshold speed, and to cause the operating speed of each of the plurality of fans to be driven at the nominal speed when the nominal speed setting is less than or equal to the threshold speed.

11. An anti-vibration system comprising:
one or more disk drives positioned in a defined area;
a plurality of fans controllable to provide an airflow in the defined area; and
a controller effective to
determine a nominal speed setting for each of the plurality of fans,
compare the determined speed setting to a predetermined threshold speed,
determine a speed range for each of the plurality of fans for which the determined speed setting is above the predetermined threshold speed, and
cause each of the plurality fans to be driven in accordance with the determined speed settings and speed ranges such that an operating speed for each of the plurality of fans is caused to oscillate throughout the respective speed ranges.

12. The system of claim 11, further comprising:
a memory medium effective to store a predetermined nominal speed setting for each of the plurality of fans and a predetermined speed range about the nominal speed settings for any of the plurality of fans having a nominal speed setting greater than the threshold speed; and the controller is effective to determine the nominal speed setting and the speed range by obtaining the predetermined nominal speed setting and the speed range from the memory medium.

13. The system of claim 12, further comprising:
a user interface effective to receive one or more of the nominal speed settings for the plurality of fans and the speed ranges from an external source; and
the controller is effective to store the received nominal speed settings and speed ranges in the memory medium.

14. The system of claim 12, the nominal speed settings for the plurality of fans further comprising an independent speed setting for each of the plurality of fans.

15. The system of claim 14, wherein the controller is further effective to determine a different starting speed for each of the plurality of fans and cause the operating speed of each of the plurality of fans to be driven from their respective determined starting speed through a common speed range.

16. A method of reducing vibration in a defined area having one or more disk drives and a plurality of fans, the method comprising the steps of:
determining a nominal speed setting for each of the plurality of fans;
comparing the determined speed setting to a predetermined threshold speed;
determining a speed range for each of the plurality of fans for which the determined speed setting is above the predetermined threshold speed; and
causing each of the plurality of fans to be driven at an operating speed in accordance with the determined speed settings and speed ranges such that the operating speed for each of the plurality of fans is caused to oscillate throughout the respective speed ranges.

17. The method of claim 16, further comprising storing a predetermined nominal speed setting for the each of the plurality of fans and a predetermined speed range about the nominal speed settings for any of the plurality of fans having a nominal speed setting greater than the threshold speed; and
wherein the steps of determining the nominal speed setting and the speed range comprise obtaining the stored predetermined nominal speed setting and the speed range from a memory medium.

18. The method of claim 17, further comprising steps of:
receiving the nominal speed settings for the plurality of fans and the speed ranges from an external source via a user interface functionally linked to the controller; and
storing the received nominal speed settings and speed ranges in the memory medium.

19. The method of claim 17, the nominal speed setting for each of the plurality of fans further comprising an independent speed setting for each of the plurality of fans.

20. The method of claim 19, further comprising:
determining a different starting speed for each of the plurality of fans and causing the operating speed for each of plurality of fans to oscillate from their determined starting speed through a common speed range.

* * * * *